Patented Feb. 9, 1943

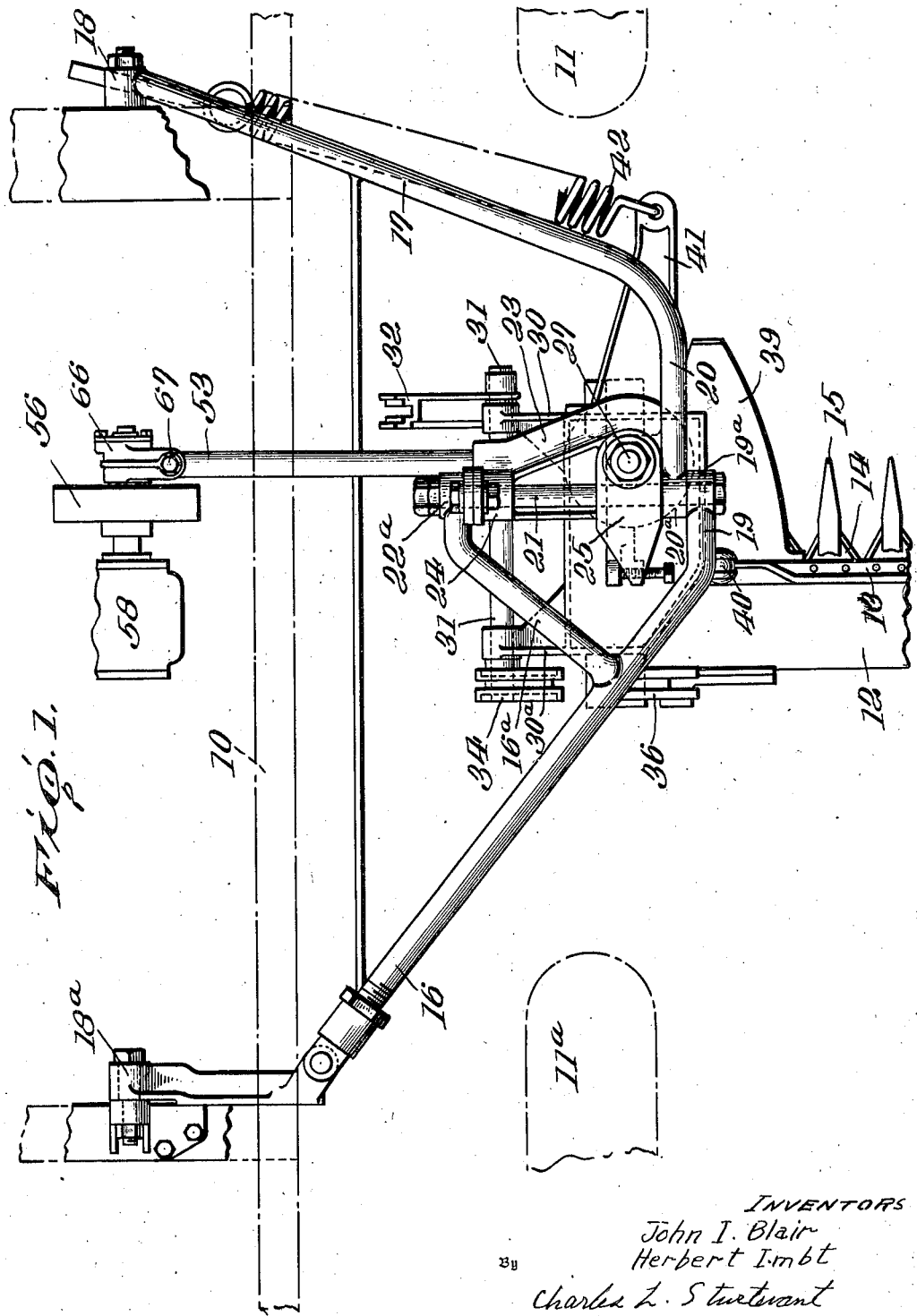

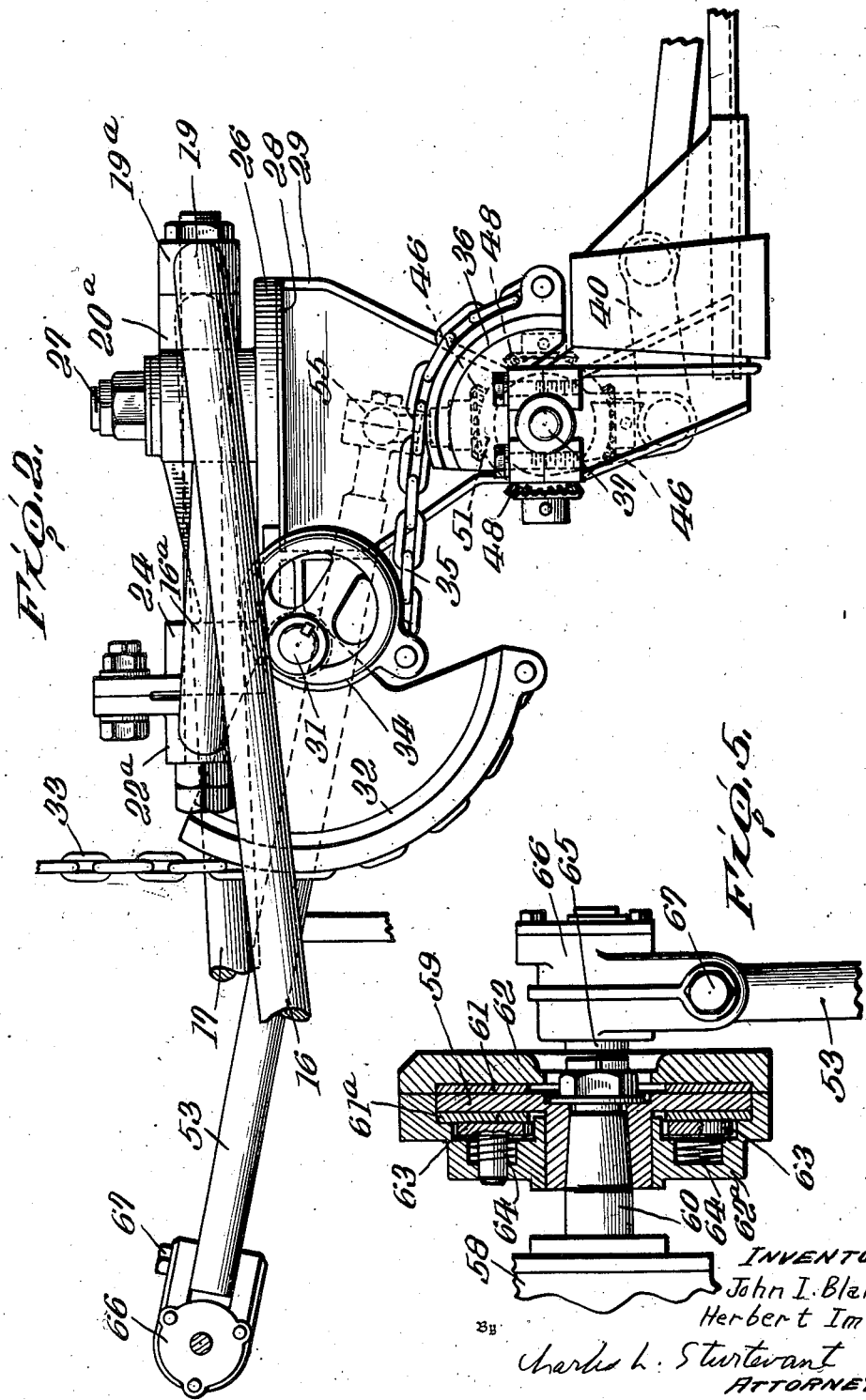

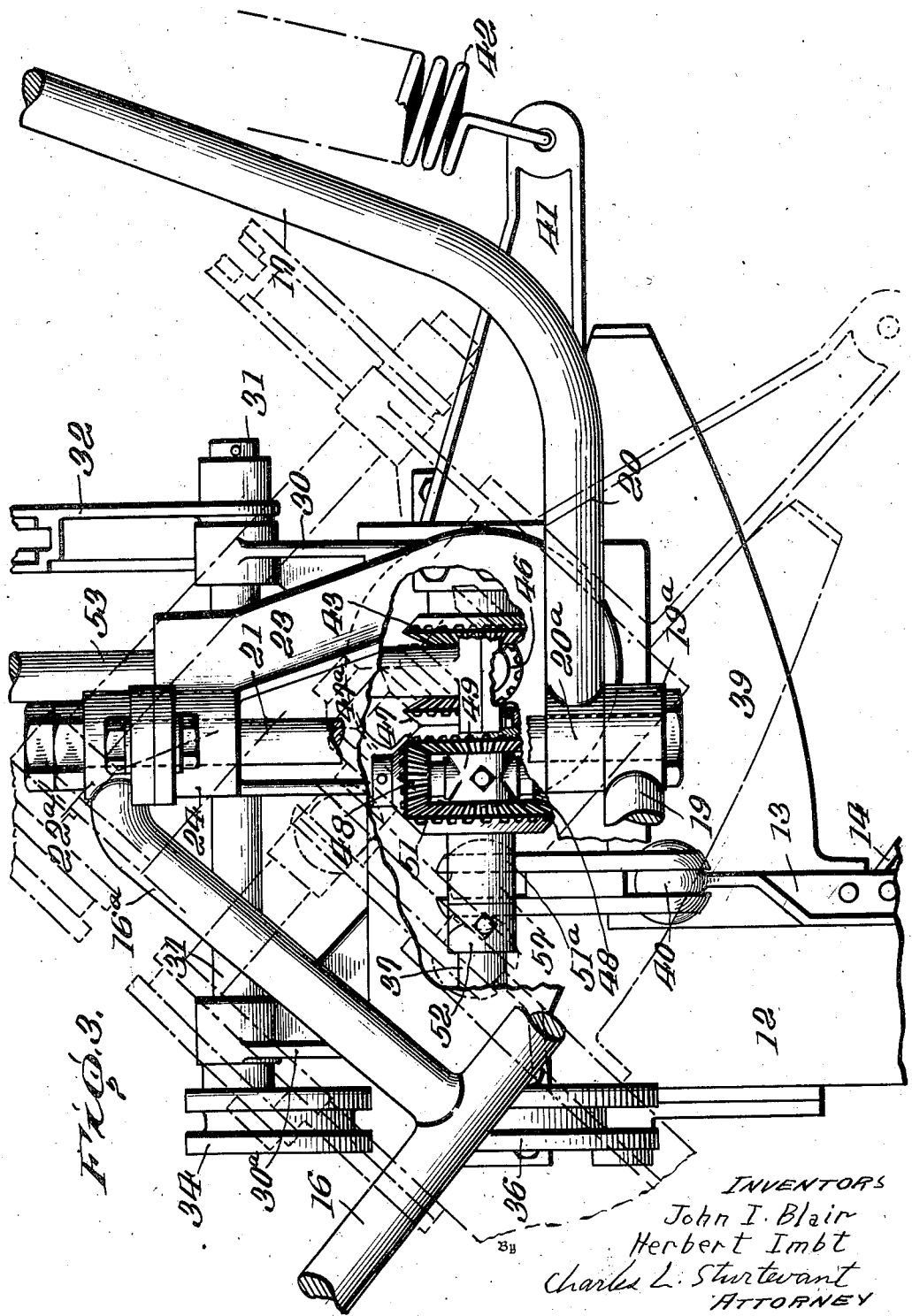

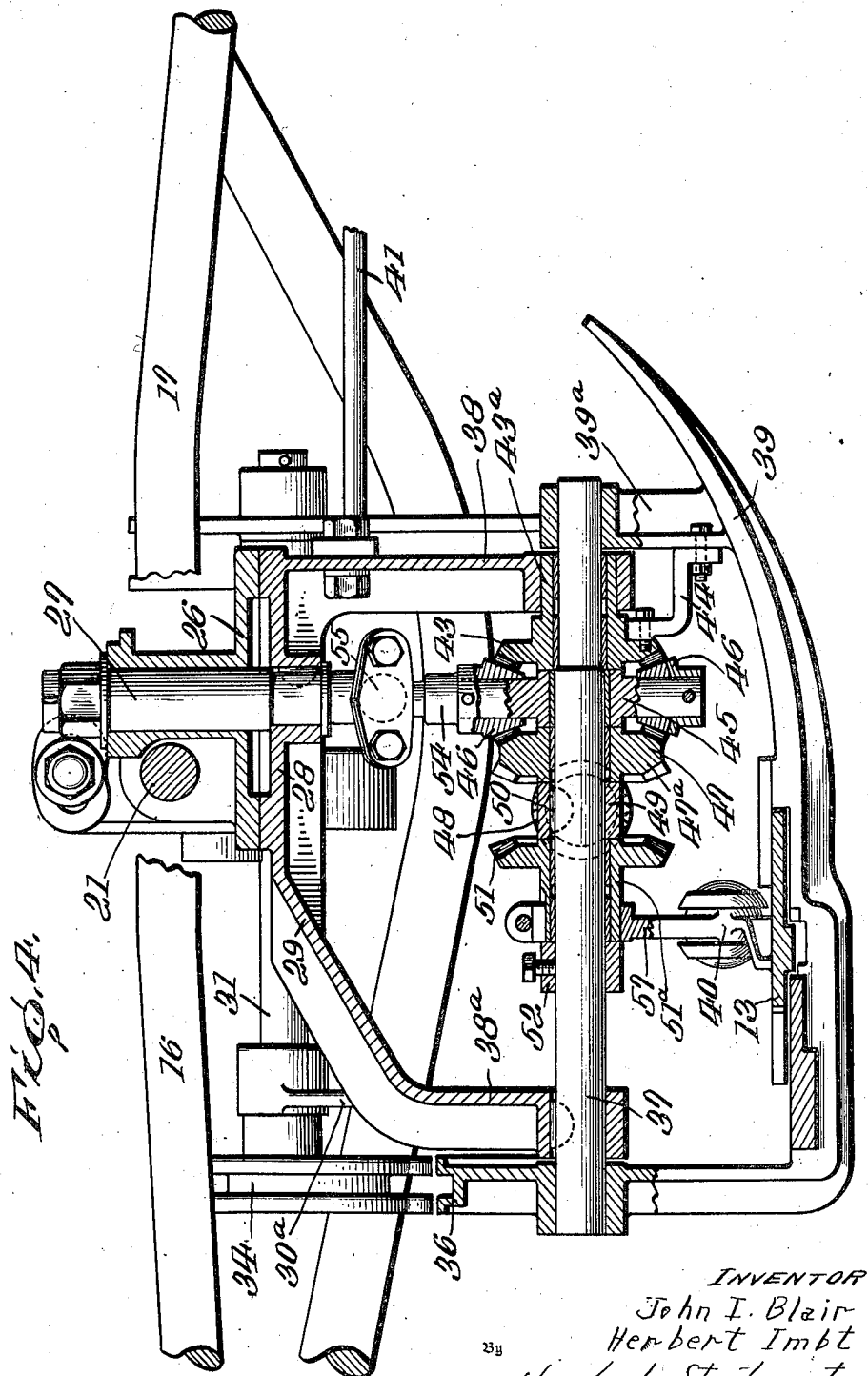

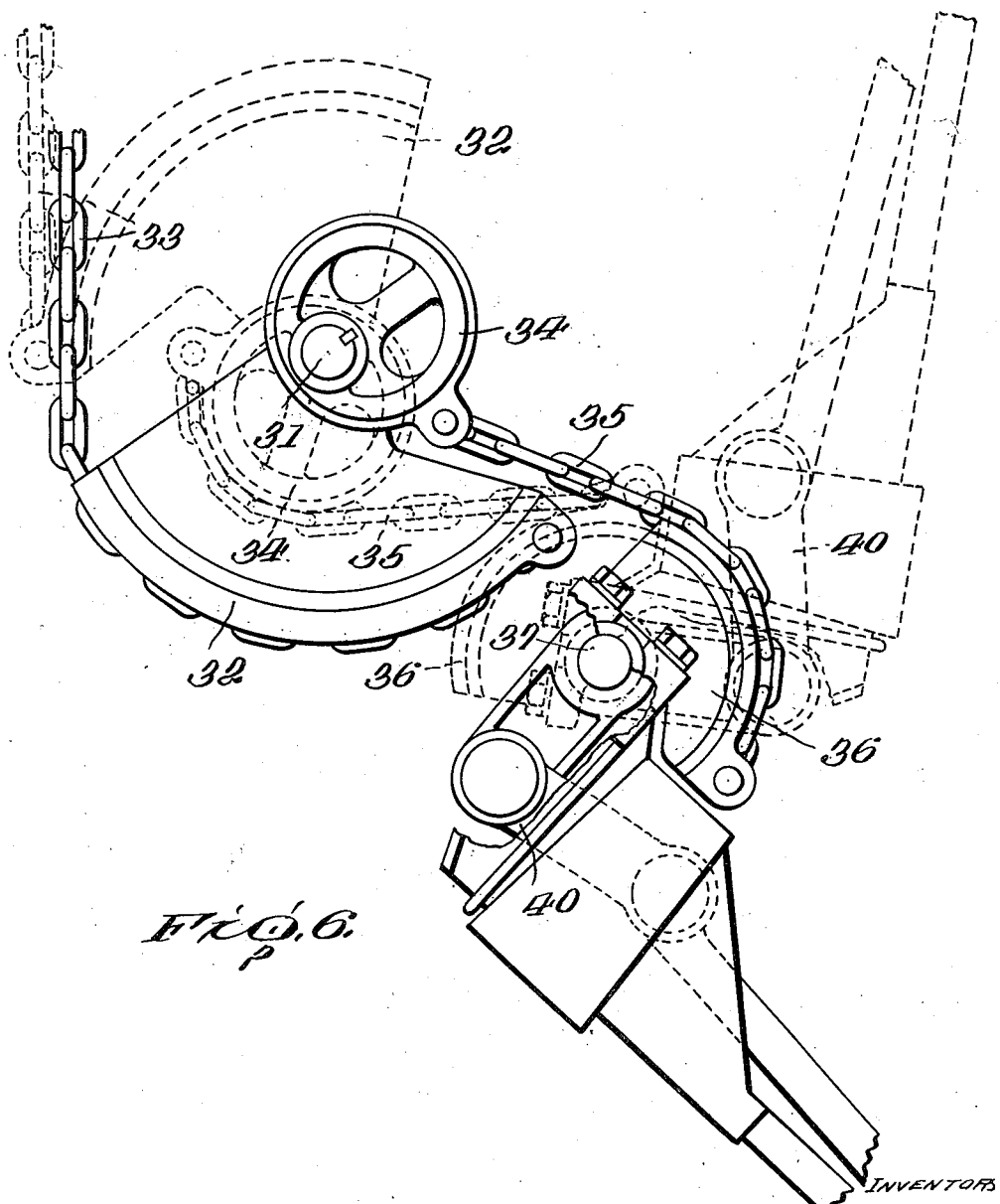

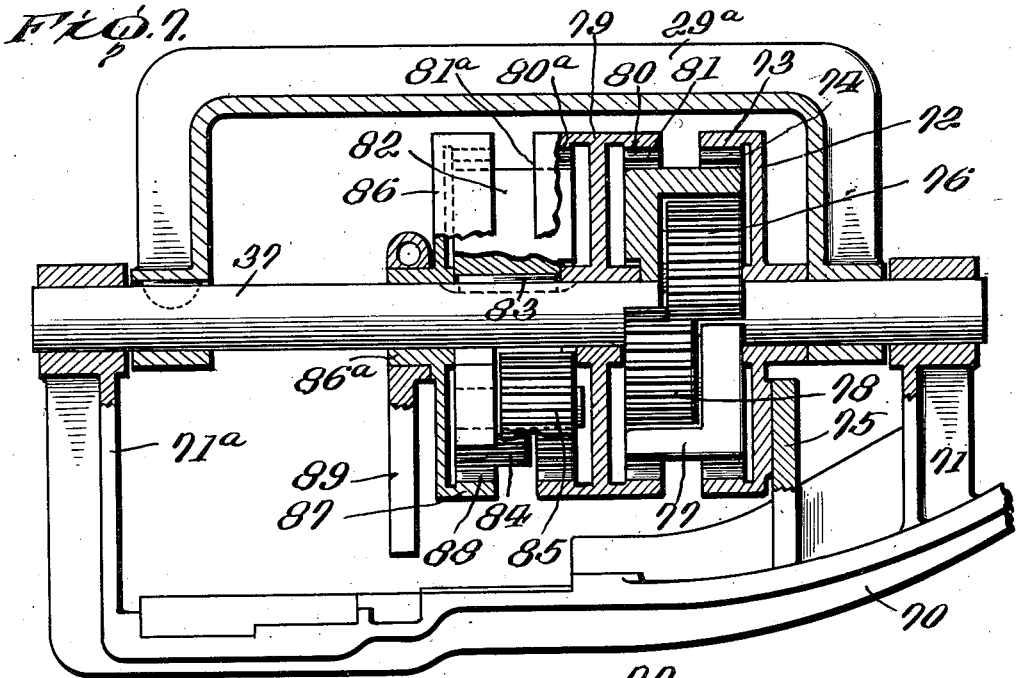
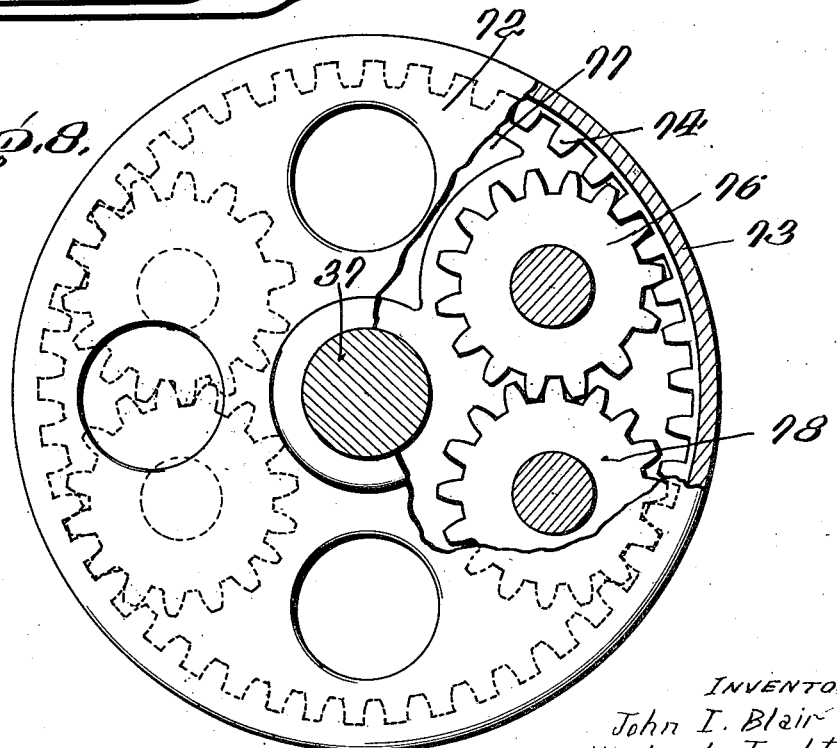

2,310,386

UNITED STATES PATENT OFFICE 2,310,386

POWER TRANSMITTING MECHANISM

John Insley Blair and Herbert Imbt, Stroudsburg, Pa., assignors to Worthington Mower Company, Stroudsburg, Pa., a corporation of Delaware Application September 14, 1939, Serial No. 294,956

19 Claims. (Cl. 74—25)

The present invention relates to new and useful improvements in mechanical movements, and more particularly to improvements in a mechanism for transmitting mechanical movements between a driving member and a driven member.

An object of the present invention is to provide a mechanism for transmitting power to a driven member from a rotating, reciprocating or oscillating driving member.

A further object of the invention is to provide a mechanism of the above type which permits angular displacement of the driven member from any one of several operating positions without affecting the driving connection.

A still further object of the invention is to provide a mechanism for imparting reciprocating movement to a driven member from rotating, reciprocating or oscillating driving means.

A still further object of the invention is to provide a mechanism of the above type wherein the reciprocated driven member can assume various angular operating positions.

The invention still further aims to provide a mechanism of the above type wherein gearing means are interposed between the driving member and the reciprocated driven member and wherein the driven member can assume various angular operating positions without change in the reciprocating stroke thereof.

The invention also aims to provide a mechanism of the above type which is of relatively simple construction, which is efficient in operation and which is readily adapted for a wide variety of uses.

The above and other objects of the invention will in part be obvious and will be hereinafter more fully pointed out.

In the accompanying drawings, the invention is illustrated in its application to a mowing machine of the type which includes a tractor or other propelling means and a reciprocating cutter in the form of a sickle bar. While the invention is thus shown for purposes of illustration, it is to be clearly understood that it is not so limited, but can be employed in various other applicable ways.

In the accompanying drawings:

Fig. 1 is a top plan view of the supporting structure for the power transmitting mechanism, showing diagrammatically the relative positions of a tractor and the power take-off.

Fig. 2 is an enlarged fragmentary side view of Fig. 1, showing the supporting structure for the power transmitting mechanism.

Fig. 3 is a further enlarged fragmentary top plan view of Fig. 1, showing the supporting structure with parts broken away to show the power transmitting mechanism.

Fig. 4 is a similarly enlarged front sectional view of the supporting structure and power transmitting mechanism.

Fig. 5 is an enlarged sectional view of the driving connection between the pitman and the power take-off.

Fig. 6 is a further enlarged view, similar to Fig. 2, showing two positions of the cutter bar assembly and the elevating mechanism.

Fig. 7 is a front sectional view, similar to Fig. 4, but showing a modified form of power transmitting mechanism.

Fig. 8 is an enlarged end view of the mechanism shown in Fig. 7, with parts broken away to show the gearing arrangement.

Referring now in detail to the accompanying drawings, and particularly to Fig. 1, the tractor frame is shown diagrammatically at 10 and the front and rear wheels at 11, 11a, respectively. The cutter mechanism is of the conventional type which includes a finger bar 12 and a knife bar 13 having cutter elements 14 cooperating with the fingers 15 on the finger bar. The cutter mechanism is thus illustrated at one side of the tractor between the front and rear wheels and as extending outwardly from the tractor frame 10, although the particular location of the cutter mechanism is not essential with respect to the driving mechanism with which this invention is primarily concerned.

The supporting frame for the driving mechanism and the cutter bar includes tubular members or bars 16, 17. The bar 17 is illustrated as being pivotally connected to a forward part of the frame 10, as at 18, and the bar 16 may be similarly secured by a pivotal connection 18a to a rear part of the frame. The bars 16, 17 extend laterally and substantially horizontally from the frame. The free or outer ends 19, 20 of the bars 16, 17, respectively, are disposed substantially parallel to the tractor frame and are shaped to provide bearing members 19a, 20a disposed adjacent one another and in which the outer end of a substantially horizontal pivot shaft 21 is journalled. The shaft 21 is disposed at substantially right angles with respect to the longitudinal axis of the tractor frame and serves as a pivot on which the angle of the cutter bar can be adjusted with respect to surfaces on which it is operating. The inner end of the shaft 21 is journalled in a bearing 22a at the end of an angular extension 16a of the bar 16.

Intermediate the ends of the shaft 21, a bracket member 23 is mounted by bearing members 24, 25 and this bracket member is provided with a circular disk portion 26, through which a vertical pivot pin 27 extends. The pivot pin 27 also extends through and is suitably secured to a flat portion 28 on a bracket member 29. A portion of the undersurface of the disk portion 26 and a part of the upper surface of the flat portion 28 bear against one another and provide an annular pivotal friction surface therebetween. Thus the bracket members 23 and 29 may turn relative to one another about the pivot pin 27 so as to provide for a safety release or swing back of the cutter mechanism in a manner to be hereinafter more fully pointed out.

The bracket member 29 has inwardly extending arms 30, 30a which are mounted for rotation relative to a horizontal shaft 31. One end of the shaft 31 has mounted thereon a grooved segment member 32 to which a cable or chain 33 is secured. The opposite end of the shaft has an eccentric 34 to which one end of a cable or chain 35 is secured. The opposite end of the chain 35 is secured to a grooved segment member 36 which is rigid with the cutter bar shoe 39 and is mounted on shaft 37. This shaft 37 is supported by depending flanges or arms 38, 38a on the bracket member 29. The rear end of the cutter bar shoe 39 is secured to the segment member 36 and the forward part of the shoe is journalled on the shaft 37 by means of an arm 39a. The cutter bar is assembled with the shoe in the customary manner and the reciprocating knife bar 13 has the inner end thereof pivotally connected to one end of a link 40.

It will be seen that the entire assembly can be elevated by raising the frame supporting bars 16, 17 and that the entire bracket member 29 and the supported structure can be swung rearwardly about the pivot pin 27, as shown by the broken lines in Fig. 3. In this connection, the bracket member 29 is provided with a forwardly extending arm 41 which is secured to one end of a coil spring 42, the opposite end of which is suitably secured to the frame 10. This coil spring serves to normally maintain the cutter bar in its normal operating position, but permits a swing back of the cutter bar and bracket 29 for safety purposes when the bar strikes an obstacle. In addition, the shoe 39 and the cutter bar assembly may be rotated about the shaft 37, as shown diagrammatically in the broken line positions of Fig. 6. The purpose of this movement is to permit the cutter bar to operate at various angular inclinations with respect to the shaft 37. The cutter bar assembly is elevated by the chain and segment devices mentioned above. Thus, the cutter bar may theoretically assume any position around the shaft 37, but the supporting structure will somewhat limit this movement. In any event, the cutter bar is designed to operate in any position through an angle of substantially 180 degrees, preferably between vertical cuts.

Intermediate the ends of the shaft 37 and between the flanges 38, 38a on the bracket member 29, the mechanical movement and power transmitting mechanism which form the essential part of the present invention, is disposed and more particularly shown in Figs. 3 and 4 of the accompanying drawings. Near one end of the shaft 37, there is mounted a circular bevel gear 43. This gear may be keyed to the shaft 37 or, as illustrated, fixed to the shoe 39 by means of a bracket 44. Thus, the gear 43 is fixed with respect to the shaft and with respect to the shoe, but is capable of movement with the shoe or the shaft upon rotation thereof. In normal operation of a cutter bar in any one of a plurality of operating positions, the bevel gear 43 is stationary and acts as a circular rack with the shaft as a center.

A ring member 45 is loosely mounted on the shaft 37 for angular movement relative thereto. This ring member has one or more bevel pinion gears 46 which mesh with the gear 43 and also with another bevel gear 47 which is loosely mounted on the shaft for angular movement relative thereto. The bevel gear 47 is provided with a duplicate face 47a integral therewith or fixed thereto. The bevel gear 47a meshes with one or more bevel pinion gears 48 which are carried by a ring member 49. This ring member 49 is keyed to the shaft 37 by a pin 50 or the like. The bevel pinion gears rotate on the longitudinal axes thereof just as do the pinion gears 46, and mesh with a bevel gear 51 which is loose on the shaft 37 and capable of angular movement relative thereto. A suitable collar 53 may be employed for maintaining the gears properly positioned.

It will be seen that the bevel gear 43 is normally fixed with respect to the shaft, while the ring member 45, the bevel gears 47, 47a and the bevel gear 51 are mounted for angular movement relative to the shaft. The ring member 49 is fixed relative to the shaft, but the pinion gears 48 are free to rotate about their center axes, as are the pinion gears 46. However, the pinion gears 46 are also capable of angular movement with the ring member 45 about the shaft 37, which serves as the center axis for the ring members and the bevel gears.

The bracket arm 38a is keyed to shaft 37 which is normally stationary and the ring member 49 is also keyed to the shaft 37. The bevel gear 43 includes a skirt portion 43a and roller bearings are disposed around the shaft for mounting the same. Similarly, roller bearings are disposed between the shaft 37 and the ring member 45, the bevel gear 47, and the bevel gear 51 which includes a skirt or sleeve portion 51a.

In the application of the above mechanism to a mowing machine of the type referred to above, the ring member 45 is connected to one end of a pitman rod 53 by an extension 54 and a ball and socket joint 55. The pitman rod may be of the flexible or yielding type and is suitably connected to a crank disc 56 which is rotated from the usual power take-off 58. In place of the flexible pitman, the crank disk may be of the clutch type in order to relieve excessive strains which may occur, as when the cutter members on a sickle bar become jammed. The bevel gear 51 is rigidly connected to a depending arm 57 which is pivotally connected to the opposite end of the link 40 so as to effect reciprocation of the knife bar 13 in the manner hereinafter pointed out. As particularly shown in Fig. 5, the crank disk 56 includes a central clutch plate 59 which is secured to the power take-off shaft 60 for rotation therewith. This clutch plate 59 has friction clutch facings 61, 61a associated therewith. Outer disk members 62, 62a are suitably secured together and the facing 61 frictionally engages the inner surface of the disk member 62 and the adjacent surface of the plate 59. The disk member 62a is recessed to carry plates 63 which are pressed by springs 64 against the facing 61a, thus forcing the same against the opposite surface of the plate 59. The disk 62 carries an eccentrically mounted stud 65 which is connected to the pitman bearing 66. The pitman rod 53 is connected to the bearing 66 by a connection 67 which permits limited movement of the pitman relative thereto, in order to facilitate swing back of the cutter mechanism.

Rotation of the crank disk 56 effects reciprocation of the pitman rod 53 in known manner. Since the pitman rod is connected to the extension 54 on the ring member 45, reciprocation of the pitman rod will effect oscillation of the ring member 45 about the shaft 37, and this oscillation of the ring member 45 will cause rotation and oscillation of the pinion gears 46 about their center axes because of their meshing engagement with the normally stationary bevel gear 43. At the same time, the pinion gears will oscillate with the supporting ring member 45 so that resultant oscillation of the bevel gears 47, 47a on the shaft 37 is effected. Oscillation of the gear 47a with the gear 47 will impart rotation and oscillation to the pinion gears 48 about their center axes without, however, causing any angular movement of these bevel gears or the ring member 49 about the shaft 37. The oscillation or rotation of the pinion gears 48, depending on the gear ratio, will impart oscillating movement to the bevel gear 51 about the shaft 37, and this movement of the gear 51 will oscillate the depending arm 57 which is connected to the link 40 so as to impart the desired reciprocating movement to the knife bar 13.

The stroke of the reciprocating knife bar is preferably about three inches and the lengths of the extension 54 and the depending arm 57 are chosen for this purpose and suitable gear ratios may be employed. In the illustrated embodiment of the invention, the stroke of the knife bar remains the same in any set position thereof. When the desired angle of cutting is approximately vertical, that is, 90 degrees with respect to the normal horizontal plane, the cutter bar is elevated by the chain lifting mechanism so that it swings with the shoe upwardly about the shaft 37 to the full vertical dotted line position shown in Fig. 6. In rotating the shoe and cutter bar about the shaft 37, the bevel gear rack 43 will be similarly moved and, when the pitman rod is stationary, the pinion gears 46 will be rotated by the rack about their center axes without moving the ring member 45. Similarly, the gears 47, 47a and the pinion gears 48 will be rotated. The arm 57 is associated with the shoe and will be moved with the bevel gear 51 through the gear train in order to compensate for movement of the bevel gear 43 at the opposite end of the gear train. The end gears 51 and 43 have opposite bevel teeth so that the movement of the intermediate gears is merely idle and compensatory, thus acting as a differential gear mechanism. Likewise, the cutter bar can be elevated or shifted about the shaft 37 to any desired cutting angle without stopping the power because the gear train on the shaft 37 acts as a differential between the oppositely beveled end gears 43 and 51 which move in unison with the shoe.

From the foregoing specific description of the invention, it will be seen that rotary motion of the power take-off and crank disk is converted into reciprocating motion of the pitman rod which, in turn, transmits swinging or oscillating movement to the extension arm on the ring member 45 on the shaft 37. The pinion gears 46 are carried with the ring member 45 about the shaft 37 and are caused to rotate and oscillate about their own central axes by engagement with the bevel gear rack 43. Thus, oscillation of the bevel gears 47, 47a may be effected from rotary, reciprocating or oscillating movements. Oscillation of the bevel gear 47a causes rotation and oscillation of the pinion gears 48 about their own axes, but not about the shaft 37, and the meshing bevel gear 51 effects swinging or oscillating movement of the depending arm 57 which, in turn, causes reciprocation of the knife bar or driven member. The differential gear train, in normal power transmitting operation, causes each forward stroke of the pitman rod to effect a corresponding forward stroke of the arm 57 and knife bar, and vice versa.

The pinion gears 46 may be considered planetary gears, in that they are adapted to travel with the ring member 45 in its movement relative to the shaft 37. It is obvious that these gears may be caused to travel with the ring member 45 entirely around the shaft 37 or the gear 43 for certain applications of the invention where such rotary movement of the ring member 45 is desired. Similarly, there may be changes in other gearing features without departing from the spirit of the invention.

As previously indicated, the bracket 29, gear mechanism and cutter bar assembly may be swung back about the pivot pin 27 to the dotted line position shown in Fig. 3. This safety release movement of the assembly is made against the action of spring 42 which normally holds the assembly in operating position except when the cutter bar strikes an obstacle. The ball and socket joint 55 between the pitman rod 53 and the extension arm 54 permits this movement of the assembly without undue strain on the pitman rod because of the pivotal connection 67, and when a flexible pitman rod is employed the pitman rod will bend and permit a further swing back without the necessity of cutting off the power.

In conclusion, it will be seen that the present invention provides a power transmitting mechanism for mechanical movement wherein the driven member (bevel gear 51, arm 57, or knife bar 13) may be rotated about the shaft 37 through substantially any angle without affecting the gearing or driving mechanism. The driving movement may be rotary (pitman crank and power take-off), reciprocating (pitman rod), or oscillating (ring member 45 and arm 54), and this latter movement includes partial rotation and oscillation of the pinion gears 46. In the practical application of the invention to a mowing machine of the type referred to, there are limits to the permissive angular movement of the driven member about the shaft 37 because of the various supporting frame structures, but the design of the mowing machine may be altered to obtain any desired angle of cut. However, in the illustrated embodiment of the invention, the cutting angle is substantially 180 degrees from a position with the cutter bar extending vertically upwardly to a position wherein it extends vertically downwardly.

In Figs. 7 and 8 there is shown a modified form of gear arrangement wherein planetary spur gears are employed. The shoe 70 is mounted on shaft 37 by upstanding arms 71, 71a and the bracket member 29a is similarly connected to the shaft 37. Within the bracket 29a and near one end of the shaft 37, there is mounted a disk member 72 which has an annular flange 73, the inner surface of which is provided with gear teeth 74. The member 72 is loose on shaft 37 and is connected to the shoe by means of a bracket 75 so that movement of the shoe about the shaft 37 will effect corresponding movement of the disk 72 in the same manner as hereinbefore pointed out. The teeth 74 thus provide a rack with which a planetary spur gear 76 meshes. A member 77 is carried on shaft 37 for angular movement relative thereto, and this member is suitably recessed to house meshing spur gears 76, 78 which are rotatably carried thereby. The member 77 may be driven in any suitable manner. Thus, the member 77 may be rotated or, as previously pointed out, it may be oscillated by a pitman connection (Figs. 1 through 4).

A member 79 is also mounted on the shaft 37 for angular movement relative thereto. This member 79 is provided with oppositely directed flanges 80, 80a, the inner surfaces of which are provided with teeth 81, 81a, respectively. The teeth 81 mesh with the spur gear 78 so that movement of the member 77 about the shaft 37 will cause opposite rotation of the spur gears 76, 78 and effect movement of the member 79 by engagement between the gear 78 and the teeth 81.

There is a further gear-carrying member 82 which is keyed to the shaft 37, as at 83. This member 82 carries rotatable meshing planetary spur gears 84, 85. The spur gear 85 is in mesh with the teeth 81a on the member 79 so that movement of the member 79 will effect corresponding rotation of the spur gear 85. The spur gear 84 will be oppositely rotated. A disk member 86 is loosely mounted on the shaft 37 for angular movement relative thereto and is provided with an annular flange 87 oppositely directed with respect to the flange 73 on the disk member 72. This flange 87 is provided with internal teeth 88 which mesh with spur gear 84. The disk member 86 is provided with a sleeve portion 86a to which a driven member, as, for instance, an arm 89, may be connected.

It will be seen, therefore, that the same advantageous results are obtained with the modified form of the invention, as shown in Figs. 7 and 8. Thus, movement of the gear carrying member 77 will effect rotation of the planetary spur gear 76 through its meshing engagement with the rack teeth 74, and this will result in rotation of the planetary spur gear 78 in the opposite direction. Rotation of the gear 78 will cause similar movement of the gear member 79 through the teeth 81 and the teeth 81a will cause similar rotation of the planetary spur gear 85 which, in turn, will cause opposite rotation of the meshing planetary spur gear 84. Thus, spur gear 84 will then impart similar movement to the gear member 86 which may serve as the driven member or which may be connected to a driven member in the form of the arm 89 or the like. Thus, this modified form of the invention provides differential gearing of the planetary spur type and similar movements of the driven member about the shaft 37 will be permitted, as previously described. As pointed out in connection with the first form of the invention, the ultimate driven member may be operated from reciprocating, oscillating or rotating driving means.

As indicated above, the invention has been shown, merely for purposes of illustration, with a particular type of mowing machine, but it is to be clearly understood that the invention has a wide variety of applications and that an oil-tight housing may be provided around the gears. It is also to be clearly understood that various changes in the details of construction and arrangement of parts may be made for various applications of the invention without departing from the scope of the invention as set forth in the appended claims.

Having thus described the invention, what is claimed is:

1. Power transmitting mechanism comprising a driving member, a normally stationary shaft, a bevel gear mounted on said shaft for angular movement relative thereto and having opposite bevel faces, means associated with said driving member and engaging one of said faces for oscillating said bevel gear, a driven member, and means interposed between the other face of said bevel gear and said driven member and supported by said shaft for operating the said driven member.

2. Power transmitting mechanism comprising a driving member, a normally stationary shaft, a bevel gear mounted on said shaft for angular movement relative thereto, means associated with said driving member for oscillating said bevel gear, a driven member, and means including a pinion gear having the central axis thereof fixed with respect to said shaft and normally stationary for operating said driven member from said bevel gear.

3. Power transmitting mechanism comprising a shaft, a bevel gear normally fixed with respect to said shaft, a bevel gear mounted on said shaft for oscillating movement, driving means including a pinion gear meshing with said bevel gears for oscillating the second said bevel gear, a driven member, and means including a pinion gear having the central axis thereof fixed with respect to said shaft for effecting operation of said driven member.

4. Power transmitting mechanism comprising a shaft, a circular rack fixed with respect to said shaft and having bevel teeth, a bevel gear mounted on said shaft for angular movement relative thereto and having the teeth thereof facing said rack, driving means including a pinion gear meshing with said rack and movable angularly of said shaft, and differential gear means between said pinion gear and said bevel gear for operating the said bevel gear.

5. Power transmitting mechanism comprising a shaft, a driven member, a pinion gear, means for mounting said pinion gear for angular movement about its axis and for planetary movement about said shaft, driving means for said pinion gear, a bevel gear mounted on said shaft for angular movement with respect thereto and in mesh with said pinion gear, and means including a pinion gear movable about its axis but fixed with respect to said shaft for transmitting power from said bevel gear to said driven member.

6. Power transmitting mechanism comprising a shaft, a reciprocable driven member, a bevel gear mounted on said shaft for angular movement with respect thereto and connected to said driven member, a second bevel gear mounted on said shaft for angular movement relative thereto, driving means for oscillating said second bevel gear, and means for transmitting the oscillating movement of said second bevel gear to said first bevel gear whereby to reciprocate the driven member.

7. Power transmitting mechanism comprising a shaft, a reciprocable driven member mounted for angular movement about said shaft, a bevel gear mounted on said shaft for angular movement relative thereto and connected to said driven member, an arcuate rack mounted only for angular movement about said shaft in unison with said driven member, and means including differential gearing between said rack and said bevel gear for oscillating said bevel gear to reciprocate said driven member and for permitting angular movement of said driven member without affecting the driving connection.

8. Power transmitting mechanism comprising a shaft, a double-faced gear mounted on said shaft for angular movement relative thereto, a gear having a fixed axis and meshing with one face of said double-faced gear, a gear having a movable axis and meshing with the other face of said double-faced gear, a driven gear mounted on said shaft for angular movement relative thereto and meshing with said fixed axis gear, a rack fixed with respect to said shaft and meshing with said movable axis gear, and means for shifting the axis of said movable axis gear for transmitting movement to said driven gear through the double-faced gear and the fixed axis gear.

9. Power transmitting mechanism comprising a supporting shaft, rack means normally fixed with respect to said shaft, a pinion gear having the axis thereof movable about said shaft and meshing with said rack means, a double oppositely faced bevel gear mounted on said shaft for angular movement relative thereto with one face thereof meshing with said pinion gear, a pinion gear having the axis thereof fixed with respect to said shaft and meshing with the opposite face of said bevel gear, a driven bevel gear mounted on said shaft for angular movement with respect thereto and meshing with the said fixed axis pinion gear, a driven member connected to said driven bevel gear, and driving means for shifting the axis of said movable axis pinion gear about said shaft whereby to transmit power from said driving means to said driven member through said gears.

10. Power transmitting mechanism comprising a shaft, a driven member, a support for said driven member mounted on said shaft for angular movement with respect thereto, a circular bevel rack surrounding said shaft and fixed to said support, a pinion gear movable about its axis and mounted for angular movement about said shaft and in mesh with said rack, a bevel gear spaced from said rack and mounted on said shaft for angular movement with respect thereto, means connecting said bevel gear to said driven member, differential gearing interposed between said pinion gear and said bevel gear, and driving means for transmitting power through said gears to said driven member.

11. Power transmitting mechanism comprising a shaft, a reciprocable driven member, a support for said driven member mounted on said shaft for angular movement with respect thereto, a circular bevel rack surrounding said shaft and fixed to said support, a pinion gear movable about its axis and mounted for angular movement about said shaft and in mesh with said rack, a bevel gear spaced from said rack and mounted on said shaft for oscillating movement with respect thereto, means including a link connecting said bevel gear to said driven member, means including a pitman rod for oscillating said pinion gear about the shaft, and means including a double-faced bevel gear carried by said shaft with one face thereof in mesh with said pinion gear for effecting reciprocation of said driven member without changing the stroke thereof.

12. Power transmitting mechanism comprising a supporting shaft, a member mounted on said shaft for angular movement relative thereto and adapted to be connected to driving means, a double-faced gear mounted on said shaft for angular movement relative thereto, means including a gear carried by said member and meshing with one face of said double-faced gear for effecting movement thereof in accordance with movement of said member, a driven member, and means including a gear meshing with the opposite face of said double-faced gear for effecting operation of said driven member.

13. Power transmitting mechanism comprising a supporting shaft, a movable member mounted on said shaft for angular movement relative thereto and adapted to be connected to driving means, a double-faced gear mounted on said shaft for angular movement relative thereto, means including a gear carried by said movable member and meshing with one face of said double-faced gear for effecting movement thereof in accordance with movement of said movable member, a driven member, a stationary member fixed with respect to said shaft, and means including a gear carried by said stationary member and meshing with the opposite face of said double-faced gear for effecting operation of said driven member.

14. Power transmitting mechanism comprising a supporting shaft, a movable member mounted on said shaft for angular movement relative thereto, a double-faced gear mounted on said shaft for angular movement relative thereto, means including a planetary spur gear carried by said movable member and meshing with one face of said double-faced gear for effecting movement thereof in accordance with movement of said movable member, a driven member, a stationary member fixed with respect to said shaft, and means including planetary intermeshing spur gears carried by said stationary member with one of said spur gears meshing with the other face of said double-faced gear and with another of said spur gears meshing with said driven member for effecting the operation of said driven member.

15. Power transmitting mechanism comprising a supporting shaft, rack means surrounding said shaft, a movable member mounted on said shaft for angular movement relative thereto and adapted to be connected to driving means, a double-faced gear mounted on said shaft for angular movement relative thereto, intermeshing planetary spur gears carried by said movable member, one of said spur gears meshing with said rack means and another of said spur gears meshing with one face of said double-faced gear, a stationary member fixed with respect to said shaft and carrying planetary spur gears one of which meshing with the other face of said double-faced gear, and a driven member meshing with another of the spur gears on said stationary member.

16. Power transmitting mechanism comprising supporting shaft means, a reciprocable driven member adapted to assume various operating positions about the axis of said shaft means, a gear carried by said shaft means and connected to and angularly movable with said driven member, an opposed gear angularly movable with said driven member, and means including an intermediate bevel gear carried by said shaft means for angular movement about the axis thereof and operatively associated with the other said gears for reciprocating said driven member in any angular position around the axis of said shaft means without changing the reciprocating stroke.

17. Power transmitting mechanism comprising a driven member, means providing a normally stationary supporting shaft, a gear carried by said shaft for planetary movement about the axis thereof and for angular movement about its own axis, a second gear fixed with respect to said shaft and adapted for angular movement about its own axis, gear means interposed between said gears, and means operable through said gears and said gear means for driving said driven member.

18. Power transmitting mechanism, comprising supporting shaft means, a driven member adapted to move angularly about the axis of said shaft means, intermeshing gears carried by said shaft means and including a gear spaced from the shaft means with the axis thereof fixed relative to the shaft means, and means including a driving pinion gear mounted for planetary movement about the shaft means and for angular movement about its own axis for transmitting power through said intermeshing gears to said driven member.

19. Power transmitting mechanism, comprising supporting shaft means, a reciprocable driven member adapted to be moved angularly about the axis of said shaft means, intermeshing gears supported by said shaft means and including a pair of opposed gears angularly movable in unison with angular movement of the driven member about the axis of the shaft means whereby to maintain a constant reciprocating stroke of the driven member, and driving means for transmitting power to said driven member through the intermeshing gears.

JOHN I. BLAIR.
HERBERT IMBT.